United States Patent [19]

Sodaro

[11] 3,947,213
[45] Mar. 30, 1976

[54] MOLD FOR RECYCLED RUBBER ARTICLES

[75] Inventor: Alfred C. Sodaro, Eugene, Oreg.
[73] Assignee: Scientific Developments, Inc., Eugene, Oreg.
[22] Filed: Mar. 20, 1975
[21] Appl. No.: 560,496

[52] U.S. Cl. ............ 425/451.9; 425/411; 425/412
[51] Int. Cl.². B30B 9/28; B30B 15/00; B29H 19/00
[58] Field of Search ............ 425/406, 407, 411, 412, 425/415, 416, 423, 451.9

[56] References Cited
UNITED STATES PATENTS

| | | | |
|---|---|---|---|
| 937,105 | 10/1909 | Simons | 425/412 X |
| 1,614,601 | 1/1927 | Davis | 425/411 X |
| 1,640,949 | 8/1927 | Loomis | 425/416 X |
| 2,459,205 | 1/1949 | Wells et al. | 425/412 |
| 3,004,291 | 10/1961 | Schad | 425/451.9 X |
| 3,200,438 | 8/1965 | McIlvin | 425/451.9 X |
| 3,287,486 | 11/1966 | Jurgeleit et al. | 425/412 X |
| 3,526,688 | 9/1970 | Shelton et al. | 425/416 X |

Primary Examiner—J. Howard Flint, Jr.
Attorney, Agent, or Firm—Harris Zimmerman

[57] ABSTRACT

A mold for forming a recycled rubber material under high pressure and temperature comprises a female mold member having a rectangular solid exterior and a pyramid cavity extending into the base thereof. A pair of opposed detents or latches are pivotally secured to each end of the female mold member, adjacent to a pair of slots extending into each end. The male mold member comprises a base plate from one side of which extends a pyramid member. To the opposite side a pair of parallel bars is welded, disposed to be received in the slots in the female member. With a charge of recycled rubber material disposed in the female member of the mold, the pyramid portion of the male mold member is placed in the mold cavity, and the two are compressed together by external means, creating very high pressure in the rubber material. The detents are pivotted to engage the bars, locking the mold members together and maintaining the high internal pressure without the external means.

4 Claims, 11 Drawing Figures

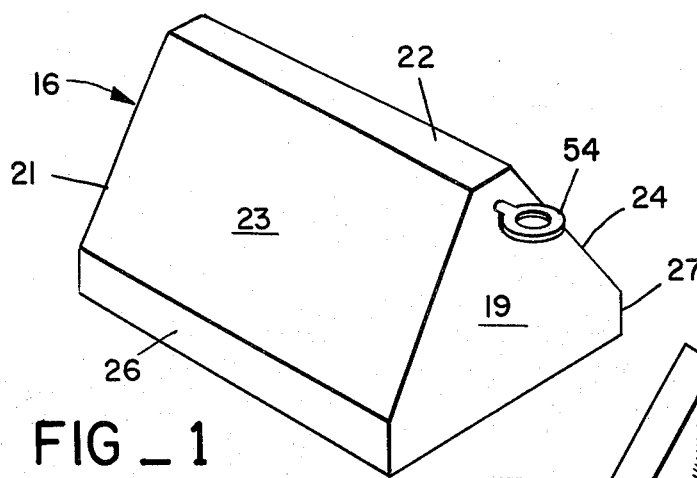
FIG_1
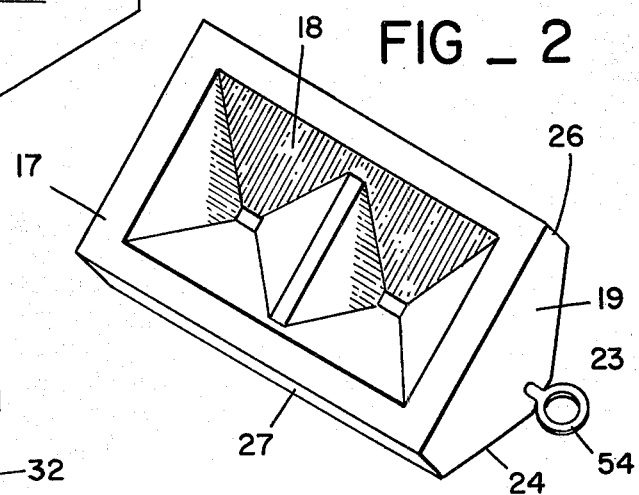
FIG_2
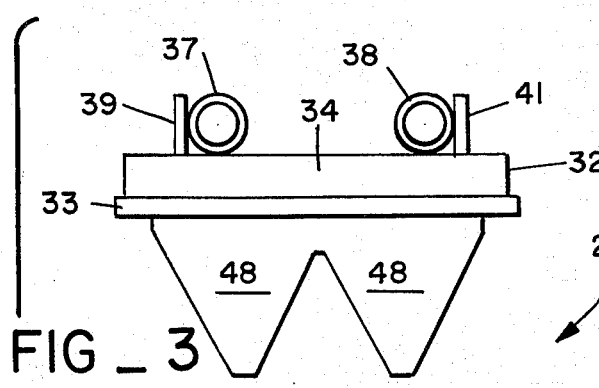
FIG_3
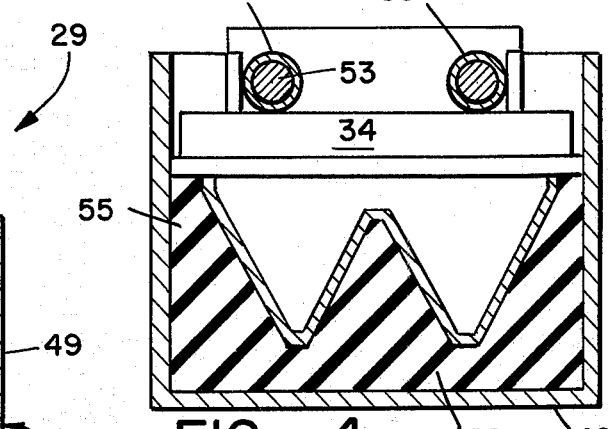
FIG_4
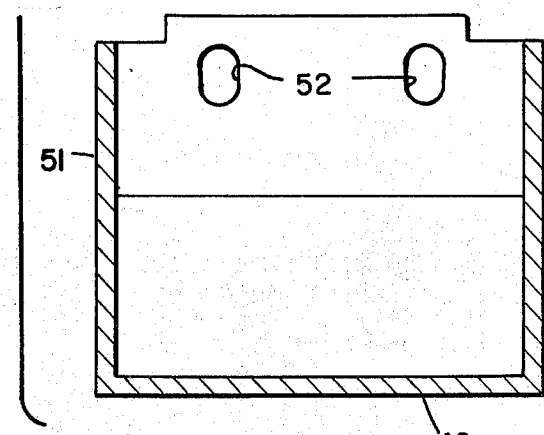
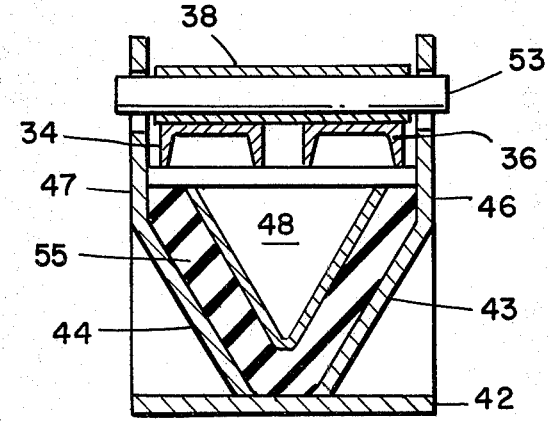
FIG_5

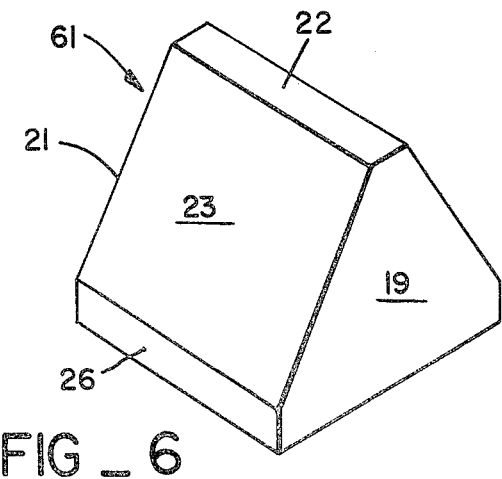
FIG_6
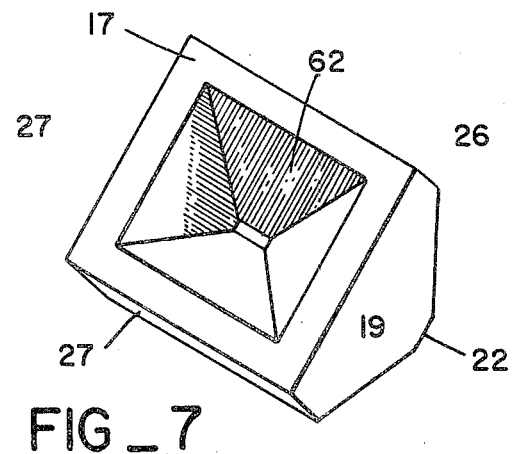
FIG_7
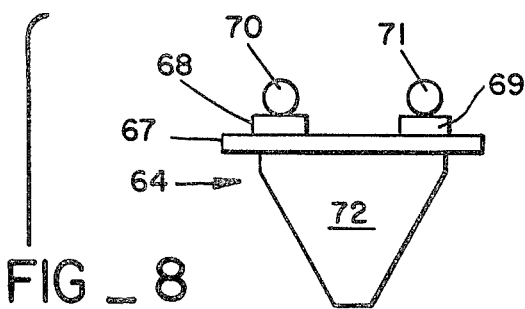
FIG_8
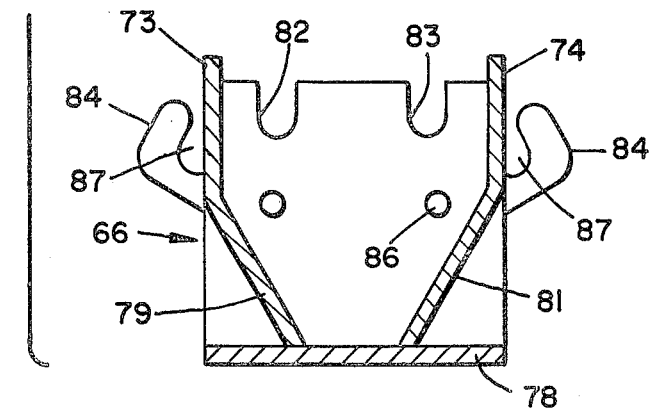
FIG_9
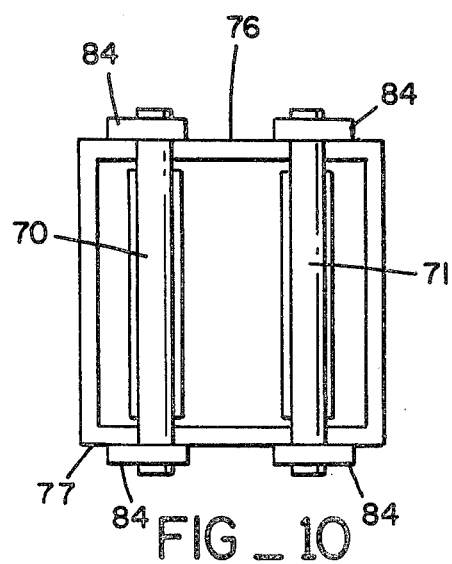
FIG_10
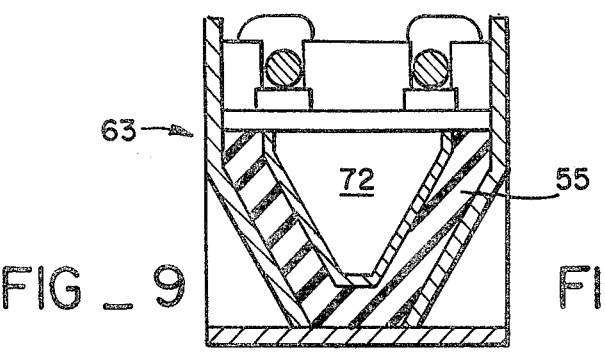
FIG_11

MOLD FOR RECYCLED RUBBER ARTICLES

BACKGROUND OF THE INVENTION

Recent developments and innovations in the field of recycling used rubber articles, in particular automobile tires, have determined that longstanding problems of disposal of waste rubber may be soluble by new, economically feasible recycling processes. However, new molding techniques are required to fashion useful articles from the recycled material, due to the high pressure and temperature required to effect repolymerization. The molds must be capable of generating, maintaining, and withstanding intense pressure in the mold change, and also must transfer heat evenly and efficiently to the molded material.

SUMMARY OF THE INVENTION

The present invention provides a molding device which is designed to maintain intense pressure on the mold change while providing thereto rapid heating and cooling. The female mold member includes pivotting detents or latches at each end thereof, and the male mold member includes a pair of bars secured thereto which are engaged by the detents or latches. After the mold change is placed in the mold, the mold members are compressed together by hydraulic or similar means, and the detents are secured to the bars, maintaining the compression on the mold change. The male mold member is hollow, creating a large external surface which is exposed to the heat of the molding furnace, increasing the heat transfer capability of the member. Also the reduced mass of the male member results in less thermal inertia and quicker heating and cooling.

THE DRAWING

FIG. 1 is a top perspective view of a molded article fashioned by the present invention.

FIG. 2 is a bottom perspective view of the article shown in FIG. 1.

FIG. 3 is a cross-sectional elevation of an embodiment of the present invention adapted to fashion the article depicted in FIGS. 1 and 2.

FIG. 4 is a cross-sectional elevation of the embodiment of FIG. 3.

FIG. 5 is a side cross-sectional view of the embodiment of FIGS. 3 and 4.

FIG. 6 is a top perspective view of another article fashioned by the mold of the present invention.

FIG. 7 is a bottom perspective view of the article shown in FIG. 6.

FIG. 8 is a cross-sectional view of the parts of another embodiment of the present invention which fashion the article of FIGS. 6 and 7.

FIG. 9 is a cross-sectional view of the joined parts of the embodiment shown in FIG. 8.

FIG. 10 is a top view of the embodiment of FIGS. 8 and 9.

FIG. 11 is a detailed end view of the latch portion of the second embodiment.

DESCRIPTION OF THE PREFERRED EMBODIMENT

The present invention generally comprises a molding device especially adapted for forming recycled rubber material under high pressure and temperature into useful articles. Although the preferred embodiment is directed toward such use, it may be appreciated that the invention may be employed to form other moldable materials into many useful shapes.

As shown in FIGS. 1 and 2, one article formed by a first embodiment of the present invention is a wheel chock 16 useful in blocking the wheels of vehicles, especially trucks and draft vehicles disposed on sloping roadways or the like. It is a solid having a base 17 into which extend a pair of cavities 18, each of a pyramid configuration. The chock includes opposed parallel ends 19 and 21 joined by the base and a top surface 22 parallel thereto. Opposed sloping surfaces 23 and 24 extend from the top surface to skirt sides 26 and 27.

The mold device 29 for forming the chock 16 includes a female mold member 31 and a male mold member 32 as shown in FIGS. 3 through 5. The member 32 includes a plate 33 to which is secured a pair of parallel U-shaped channel members 34 and 36. Secured atop the channel members and perpendicular thereto is a pair of pipe sections 37 and 38, each adjoined by a bar 39 and 41 secured to the channel members and pipe sections as lateral support for the latter. Depending from the plate 33 is a pair of hollow pyramid members 48 corresponding to the cavities 18 in the wheel chock.

The female mold member 31 includes a base plate 42 corresponding to the top surface 22 of the wheel chock. End plates 49 and 51 are joined normally to the base plate 42, and correspond to the ends 19 and 21 of the wheel chock. Extending between the end plates 49 and 51 and joined to the base plate are a pair of opposed sides 43 and 44 extending obliquely upward and outward corresponding to the sloping sides of the chock. The sides 43 and 44 are joined to parallel upper sides 46 and 47 extending between the end plates. Each of the upper sides is provided with a pair of spaced slots 52 aligned with counterparts in the opposite upper side.

To employ this embodiment of the invention, an amorphous mass of recycled rubber molding material 55 is placed into the female mold member, and the mold member 32 is placed in the upper open end of the female mold member. The mold member 32 is then driven down into the female mold cavity by external means, such as a hydraulic ram or the like. In this way the molding material 55 is changed into a fluid mass experiencing pressures ranging from 42,500 psi to 80,000 psi (2900 Kg./cm.$^2$ to 5,600 Kg./cm.$^2$). These high pressures are required to repolymerize the old rubber particles, the highest pressures corresponding to the lowest sulfur content of the molding mix.

To maintain these pressures during the heating stage of the molding process, a pair of solid bars 53 are inserted through the slots 52 and the pipe sections 37 and 38. These bars maintain the mold parts in a pressure generating disposition while the mold is placed in a furnace and the mold material 55 is fired. The firing considerably reduces the internal pressure as polymerization and other chemical reactions proceed, so that no added pressure is required to release and separate the mold parts after the mold is cooled. The wheel chock is then removed, and an eye bolt 54 is anchored in one end thereof.

In a further embodiment shown in FIGS. 8, 9, 10, and 11 a wheel chock 61, as shown in FIGS. 6 and 7, may be advantageously formed. The wheel chock 61 has the same general shape as the chock 16, with the exception that it is shorter from end to end, and has only one cavity 62, of pyramidal configuration, in the base 17.

The mold device 63 which produces this wheel chock includes a male mold member 64 and a female mold member 66. The male mold member includes a plate 67 and a pair of opposed bars 68 and 69 secured to the top thereof. Joined to the upper surface of the bars are a pair of rods 70 and 71 which overhang the ends of the plate 67. Depending subjacently from the plate 67 is a single pyramid-shaped cavity forming element 72.

The female mold member includes opposed parallel upper sides 73 and 74 which extend between end plates 76 and 77. Extending between the upper sides and the base 78 are sloping sides 79 and 81, the base being joined to the sloping sides and the end plates. Each end plate is provided with a pair of slots 82 and 83, aligned with the slots of its counterpart, in the upper edge of the end plates. Associated with each slot is a latch arm 84 pivotally joined to the exterior of the end plate by a pin 86 extending therefrom. Each latch arm includes a notch 87 adapted to engage and retain the rods 70 or 71 when disposed in the respective slots.

In this embodiment the charge of recycled rubber molding material is placed in the female mold member 66, and the male mold member is then placed in the mold member 66. As before, the mold members are compressed together by external means to create high pressures in the charge. In this case, the latches are then pivotted to engage the rods 70 and 71, locking the mold members together in a disposition which maintains the internal pressure of the charge. The mold is then placed in a furnace. After molding and cooling no additional pressure is required to release the mold and remove the completed wheel chock.

It should be noted that although each embodiment incorporates a particular means for locking the mold members together in combination with a particular mold design, either locking means may be employed advantageously separately or together in a wide variety of mold configurations.

I claim:
1. A molding device for use in a press comprising a first mold member having a mold cavity therein, a second mold member releasably mating with said first mold member and having a portion extending into said mold cavity, securance means for releasably joining said first and second mold members together to maintain high pressure in the mold charge said securance means including a plurality of latches pivotally secured to the exterior of said first mold member and a plurality of slots in said first mold member adjacent said latches, said second mold member including a plurality of members extending therefrom and each adapted to be seated in one of said slots and to be engaged by one of said plurality of latches when said mold members are pressed together.

2. The device of claim 1, wherein said slots and latches are disposed in opposed ends of said first mold member.

3. The device of claim 1, wherein said portion extending into said mold cavity includes at least one pyramid-shaped element.

4. A molding device for use in a press comprising a first mold member having a mold cavity therein, a second mold member releasably mating with said first mold member and having a portion extending into said mold cavity, securance means for releasably joining said first and second mold members together to maintain high pressures in the mold charge, said securance means including a plurality of holes disposed in opposed sides of said first mold member, said second mold member including a pair of parallel tubes secured thereto and aligned with said holes when said mold members are pressed together, and rod-like members insertable through and engageable with said holes and said tubes to releasably retain said mold members together.

* * * * *